W. A. TURBAYNE.
ELECTRICAL SYSTEM OF DISTRIBUTION.
APPLICATION FILED APR. 10, 1909.
962,106.
Patented June 21, 1910.
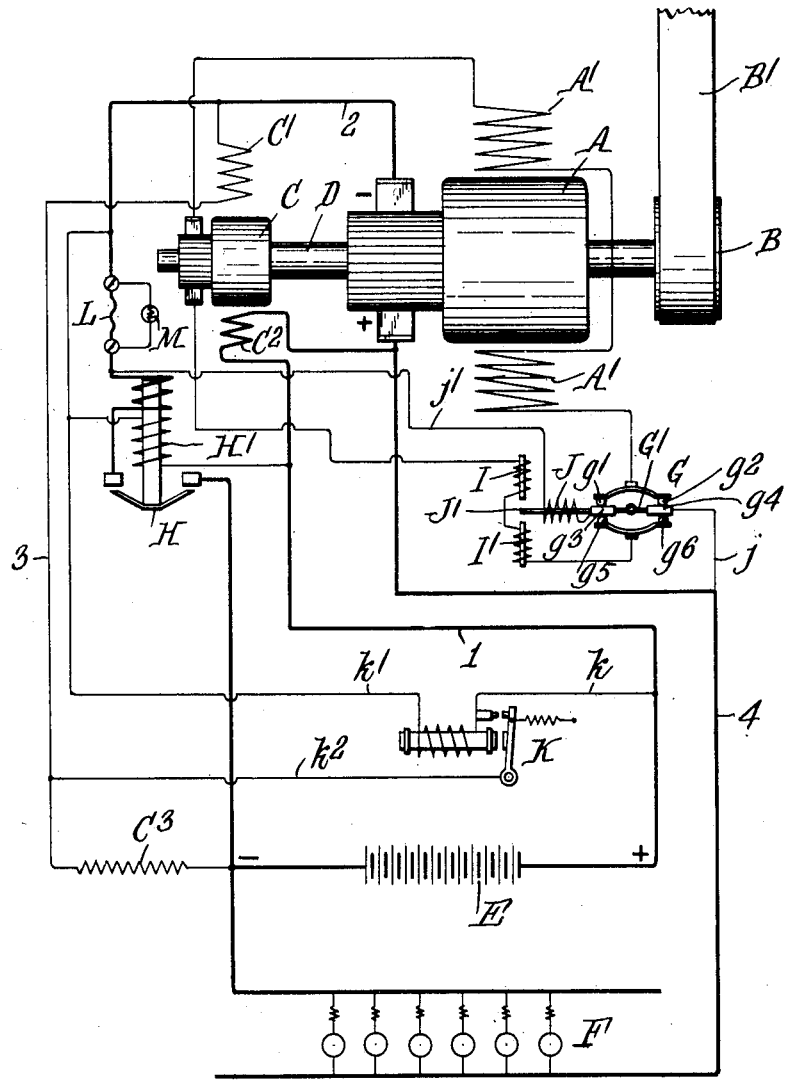
Witnesses.
A. G. Dimond
E. A. Volk
Inventor.
William A. Turbayne,
By Wilhelm, Parker & Hard,
Attorneys.

UNITED STATES PATENT OFFICE.

WILLIAM A. TURBAYNE, OF LANCASTER, NEW YORK, ASSIGNOR TO GOULD COUPLER COMPANY, OF NEW YORK, N. Y.

ELECTRICAL SYSTEM OF DISTRIBUTION.

962,106.   Specification of Letters Patent.   Patented June 21, 1910.

Application filed April 10, 1909. Serial No. 489,057.

*To all whom it may concern:*

Be it known that I, WILLIAM A. TURBAYNE, a citizen of the United States, residing at Lancaster, in the county of Erie and State of New York, have invented a new and useful Improvement in Electrical Systems of Distribution, of which the following is a specification.

This invention relates more particularly to improvements in electrical systems of distribution of the sort disclosed, for example, in application for patent, Serial No. 430,461, filed by me May 2, 1908.

The invention is especially applicable to car lighting systems in which the main dynamo or generator is driven by the movement of the car, and a storage battery is employed which is charged by said main generator and supplies the work circuit when the main generator is not in operation. The invention is not, however, restricted in application to car lighting systems.

The system described in said application comprises a main generator which is driven from one of the car axles, and is subject to the changes in the direction and speed of rotation thereof; an auxiliary regulating or exciting dynamo which excites the main generator and is arranged to be driven in the same direction and at the same speed as the main generator; and an automatically operating pole-changing device which so directs the exciting current for the main generator as to maintain the polarity thereof constant irrespective of its direction of rotation. The pole changing device also operates to insert the main generator in its own exciting circuit in proper relation to the exciting dynamo to cause the voltage of the main generator to rapidly build up at a low speed of rotation, and a main switch is provided which operates to connect the main generator across the work circuit as the electromotive force thereof reaches a suitable value. An ordinary safety fuse or circuit-breaking device is also preferably employed in the system.

The object of the present invention is to provide a by-pass around the safety fuse or device which insures a sufficient current from the main generator through the pole changing device to cause the latter to combine the circuits as in its normal operation and prevent a possible short circuiting of the battery through the pole changing device, in the event that the main generator attains sufficient speed and voltage to close the main switch when the car gets into motion again after the fuse has been blown out.

The accompanying drawing shows diagrammatically a car lighting system embodying the invention.

A represents the main dynamo or generator and A' the field winding thereof. The armature of the main generator is driven from any suitable source of power, for instance, from one of the car axles (not shown) by a pulley B and belt B'.

C represents the auxiliary or regulating dynamo, whose armature is secured to the shaft D of the main generator armature, or is otherwise connected thereto for causing the two armatures to turn in the same direction; C' and $C^2$ represent field windings of the auxiliary dynamo; E the storage battery; F the work circuit, which, in the present instance, consists of a number of lamps with a regulating resistance in the circuit of each; G the pole changing switch or device that controls the connections of the field winding A' of the main generator; and H the main switch for connecting the main generator to the work circuit.

The movable parts of the apparatus are shown in the position they occupy when the main generator is at rest, the main switch H being open and the work circuit being fed from the battery. At this time the field coil C' of the auxiliary dynamo is energized from the battery, the coil being connected across the battery through the main generator armature and a resistance $C^3$ by conductors 1, 2 and 3. The auxiliary dynamo is connected in a local circuit with the field winding A' of the main generator and the pole changing device G, the circuit being from the upper brush of the auxiliary generator through the field winding A' and thence through the contacts and the coils of magnets I and I' of the pole changing device G to the lower brush of the auxiliary dynamo. Thus when the dynamos are started the auxiliary dynamo will send an exciting current through the field of the main generator, and the coils of magnets I I' in one direction or the other, depending upon direction of rotation of its armature. As soon as the main dynamo develops an electromotive force a current is set up in a local circuit which includes main conductor 4, a conductor $j$, the contacts and a coil J of the pole changing device G and a conductor $j'$. This current energizes a magnetizable arm J' extending from a pivoted switch member G' of the pole changing device, and this arm will be attracted to the magnet I or I' according to the direction of the current from the auxiliary dynamo through the coils of the magnets. If the magnet I attracts the arm J' then the pivoted member G' will swing so as to break contact between the switch contacts $g^3$ and $g^5$ and between contacts $g^4$ and $g^2$, whereas if the magnet I' attracts the arm J' the pivoted member G' will swing so as to break contact between the contacts $g^3$ and $g'$ and between the contacts $g^4$ and $g^6$. Thus the field A' is connected in circuit with both the main generator and the auxiliary dynamo and builds up very rapidly, while at the same time the current is caused to flow through the field in one direction or the other, depending upon the direction of rotation of the generators, so as to keep the polarity of the main generator the same, in the manner more fully explained in said application. When the electromotive force of the main generator has reached the desired normal value, the main switch H is closed by the action of its coil H'. This throws the work circuit and battery in circuit with the main generator, so that a heavy current is passed through the field coil $C^2$ of the auxiliary dynamo, and short-circuits the other field coil C', thus practically eliminating its effect as an exciting element. The heavy current in the coil $C^2$ now reverses the polarity of the generator C and causes it to become a counter-electromotive force machine to oppose the electromotive force of the main generator. As the current varies in the coil the counter-electromotive force of the auxiliary dynamo will vary and consequently the electromotive force of the main generator will vary, the arrangement being such that as the current in the coil $C^2$ increases the electromotive force of the main generator will decrease, and vice versa, thus regulating the main generator and causing the current through the coil $C^2$, which is the battery charging current, to remain substantially constant.

K represents the electro-magnetic device for automatically stopping or reducing the battery charging operation when the battery is sufficiently charged. The magnet coil of this device is connected across the battery by conductors $k$ and $k'$ so as to be subject to the battery voltage. The conductor $k'$ is preferably connected with the main conductor between the main generator and the main switch. When the battery voltage attains the predetermined desired value, the magnetic device K operates to connect the conductor $k$ with a conductor $k^2$ which is connected with the coil C' of the auxiliary dynamo. This throws the coil C' directly across the terminals of the main generator so that it is traversed by a strong current from the main generator in the opposite direction from the current originally furnished to the coil by the battery. The coil C' will then act cumulatively with the coil $C^2$, and the counter-electromotive force of the auxiliary dynamo will be materially increased, with the result of effectually cutting down the voltage of the main generator and materially reducing or eliminating the battery charging current.

The system as thus far described is disclosed in said application and is herein explained to enable an understanding of the improvement now to be described.

L represents an ordinary safety fuse or circuit-breaking device located in the system between the main generator and main switch and shunted by a lamp or high resistance element M of any suitable sort. In the normal operation of the system this resistance is inactive. If the safety fuse or device operates to interrupt the circuit while the train is in motion and the generators are in operation, the coil J of the pole changing device will be energized from the battery E and the pole changing device will not be affected but will maintain the connections already established. When the generators are rotating in one direction, this circuit will be from the battery through the coil $C^2$ of the auxiliary dynamo, conductors 4, $j$, switch G, field winding A' of the main generator, armature of the generator C, coils I, I', switch G, coil J, conductor $j'$ and main switch H back to the battery. When the generators are rotating in the opposite direction, the circuit will be from the battery through the coil $C^2$, conductors 4, $j$, switch G, coils I', I, armature of the generator C, field winding A', switch G, coil J, conductor $j'$ and main switch H to the negative side of the battery. The regulating effect of the auxiliary dynamo ceases on account of the cessation of current from the main generator through the coil $C^2$, but the main generator being still excited, its voltage will rise until it becomes sufficient to cause the device K to operate as above described, to reduce the main generator excitation and prevent the voltage of the main generator from rising to an unsafe value. If the generators should be stopped by the stopping of the train, the main switch H will open, and when the train again starts up the auxiliary dynamo will excite the field A' of the main generator and magnets I and I' of the pole changing device in the manner previously described, as the coil C' of the auxiliary dynamo will be energized by the battery, the circuit being completed as before, through the conductor 1, main generator armature and conductors 2 and 3.

But with an open fuse and no shunted path around the same, no current will flow through the coil J of the pole changing device to cause any action thereof. Under these conditions, therefore, if the main generator should attain high enough speed to produce sufficient electromotive force to cause the main switch to again close, the full battery voltage would be suddenly short-circuited through the coil J of the pole changing device, the circuit being completed through the coil $C^2$ of the auxiliary dynamo, conductors 4, $j$, coil J, conductor $j'$, and the main switch H. By the use of the resistance M, however, a shunted path is provided around the fuse, and as soon as the main generator produces a substantial electromotive force a current will flow through the coil J of the pole changing device, passing from the positive side of the main generator through the conductor $j$, coil J, conductor $j'$ and resistance M to the negative side of the main generator. This will cause the pole changing device to operate and the voltage of the main generator to build up just as in the normal operation of the system, so that when the main switch closes, the battery will be simply connected across an opposing force of equal value and no damage can result. The fuse shunted by the resistance, therefore, prevents any damage to any of the windings or devices included in the exciting circuits of the various machines.

I claim as my invention:

1. In an electrical system of distribution, the combination of a main generator, a main circuit therefor, a battery in operative relation to said generator and said circuit, an auxiliary generator for exciting the main generator, switching means for connecting the auxiliary generator in proper exciting relation to the main generator, a safety device for breaking said circuit, and means which maintain a circuit including said switching means when said main circuit is broken, substantially as set forth.

2. In an electrical system of distribution, the combination of a main generator, a main circuit therefor, a battery in operative relation to said generator and said circuit, an auxiliary generator for exciting the main generator, switching means for connecting the auxiliary generator in proper exciting relation to the main generator, a safety device for breaking said circuit, and a resistance shunted around said circuit breaking device, substantially as set forth.

3. In an electrical system of distribution, the combination of a main generator, a main circuit therefor, a battery in operative relation to said generator and said circuit, an auxiliary generator for exciting the main generator, switching means for connecting the auxiliary generator in proper exciting relation to the main generator, a switch for connecting the main generator in said circuit, a safety device for breaking said circuit, and means which maintain a circuit including said switching means when said main circuit is broken, substantially as set forth.

4. In an electrical system of distribution, the combination of a main generator, a main circuit therefor, a battery in operative relation to said generator and said circuit, an auxiliary generator for exciting the main generator, switching means for connecting the auxiliary generator in proper exciting relation to the main generator, a fuse in said circuit, a switch for connecting the main generator in said circuit, and a resistance shunted around said fuse, substantially as set forth.

5. In an electrical system of distribution, the combination of a main generator, a main circuit therefor, a battery in operative relation to said generator and said circuit, an auxiliary generator, means for connecting the auxiliary generator to excite the main generator, means dependent upon the current flow from the main generator for connecting the two generators in series to excite the main generator, a safety device for breaking said circuit, and means which maintain a circuit including said switching means when said main circuit is broken, substantially as set forth.

6. In an electrical system of distribution, the combination of a main generator whose armature is driven in opposite directions, a main circuit therefor, a battery in operative relation to said generator and said circuit, an auxiliary generator whose armature is driven in the same direction as the main generator armature and which excites the main generator, means for controlling the connection of the auxiliary generator with the main generator to keep the polarity of the main generator constant, a safety device for breaking said circuit, and a resistance shunted around said circuit breaking device, substantially as set forth.

7. In an electrical system of distribution, the combination of a main generator, a main circuit therefor, a battery in operative relation to said generator and said circuit, an auxiliary generator and connections which regulate the voltage of the main generator, a safety device for breaking said circuit when the current therein reaches a certain value, and means which maintain a circuit including said regulating connections when said main circuit is broken, substantially as set forth.

8. In an electrical system of distribution, the combination of a main generator whose armature is driven in opposite directions, a main circuit therefor, a battery in operative relation to said generator and said circuit, an auxiliary generator and connections for keeping the polarity of the main generator constant, a safety device for breaking said circuit when the current therein reaches a certain value, and means which maintain a circuit including said regulating connections when said main circuit is broken, substantially as set forth.

9. In an electrical system of distribution, the combination of a main generator whose armature is driven in opposite directions, a main circuit therefor, a battery in operative relation to said generator and said circuit, an auxiliary generator and connections for regulating the voltage and keeping the polarity of the main generator constant, a safety device for breaking said circuit when the current therein reaches a certain value, and means which maintain a circuit including said regulating connections when said main circuit is broken, substantially as set forth.

10. In an electrical system of distribution, the combination of a main generator, a main circuit therefor, a battery in operative relation to the generator and to said circuit, an auxiliary generator and connections for regulating the voltage and polarity of the main generator, said auxiliary generator having an exciting coil initially energized by said battery, and an exciting coil supplied by the main generator, a safety device for breaking said circuit, and means for maintaining a circuit including said regulating connections when said main circuit is broken, substantially as set forth.

11. In an electrical system of distribution, the combination of a main generator, a main circuit therefor, a battery in operative relation to said generator and said circuit, an auxiliary generator and connections which regulate the voltage of the main generator, means for reducing the voltage of the main generator when the battery voltage reaches a predetermined value, a safety device for breaking said circuit, and means which maintain a circuit including said regulating connections when said main circuit is broken, substantially as set forth.

Witness my hand, this 2d day of April, 1909.

WILLIAM A. TURBAYNE.

Witnesses:
C. W. PARKER,
C. B. HORNBECK.